United States Patent [19]
Hall, Jr. et al.

[11] 3,772,513
[45] Nov. 13, 1973

[54] RADIOACTIVITY OIL-WATER WELL LOGGING UTILIZING NEUTRON SOURCE

[75] Inventors: Hugh E. Hall, Jr., Huntsville, Tex.; Alexander S. McKay, Calgary, Alberta, Canada; Hans J. Paap, Houston, Tex.

[73] Assignee: Texaco Inc., New York, N.Y.

[22] Filed: Mar. 5, 1971

[21] Appl. No.: 121,458

[52] U.S. Cl. ..................................... 250/262
[51] Int. Cl. ............................................ G01v 5/00
[58] Field of Search .................. 250/83.6 W, 71.5 R

[56] References Cited
UNITED STATES PATENTS

| | | | |
|---|---|---|---|
| 3,240,937 | 3/1966 | McKay et al. | 250/83.6 W |
| 3,240,938 | 3/1966 | Hall, Jr. | 250/83.6 W X |
| 3,497,692 | 2/1970 | Mills, Jr. | 250/83.6 W X |

*Primary Examiner*—Archie R. Borchelt
*Attorney*—Thomas H. Whaley, Robert J. Sanders, Jr. and Carl G. Ries

[57] ABSTRACT

Neutron-gamma radiation well logging methods and apparatus are disclosed for evaluating the oil-water contents of earth formations and which may be embodied in a logging system comprising a logging instrument to be passed through a bore hole which includes a neutron source for irradiating earth formations along the bore hole. Spaced a predetermined distance from the source along the longitudinal axis of the bore hole, there is provided a radiation detection unit comprising a proportional type radiation detector, such as a sodium iodide scintillation detector, having coupled thereto a multi-channel pulse height signal analyzer system for providing signals proportional to radiation within at least two separate predetermined energy ranges, one of which, referred to as the Channel 1 or formation reference (FR) signal, is indicative of hydrogen and is substantially insensitive to the chlorine content of the formation and the other of which, referred to as the Channel 2 or formation reference and chlorine (FR Cl) signal, is indicative of both hydrogen and chlorine in the adjacent formations. Surrounding the radiation detector, preferably around the outside of the logging instrument, there is provided a shield of a pre-selected material, such as samarium, having a relatively high capture cross-section for neutrons and characterized by having a significant thermal neutron induced gamma radiation response within the predetermined Channel 1 signal analysis range for the formation reference signal and having a relatively insignificant attendant gamma radiation response within the predetermined Channel 2 energy range for the formation reference plus chlorine signal upon the capture of a thermal neutron.

39 Claims, 6 Drawing Figures

United States Patent [19]
Hall, Jr. et al.
[11] 3,772,513
[45] Nov. 13, 1973
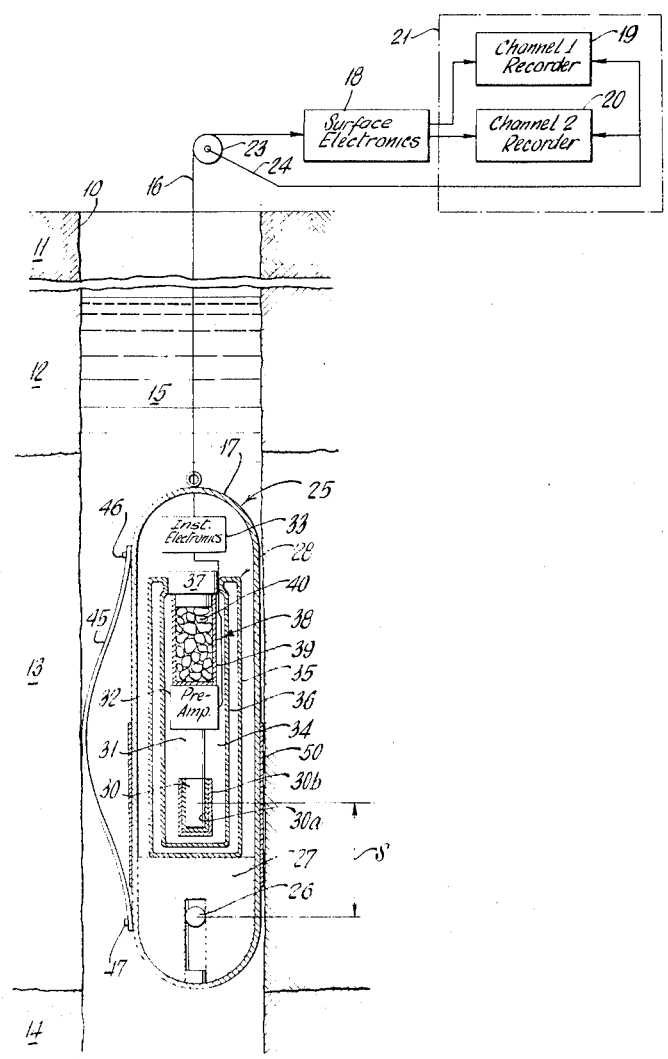

PATENTED NOV 13 1973

RADIOACTIVITY OIL-WATER WELL LOGGING UTILIZING NEUTRON SOURCE

The present invention relates generally to the determination of the nature of earth formation by neutron well logging; and, more particularly it is concerned with improvements in neutron well logging for quantitatively determining, in situ, the presence of hydrocarbon oil or salt water in earth formations traversed by a bore hole.

Accordingly, it is an object of the present invention to provide improvements in radioactivity well logging wherein a source of neutrons is employed to produce observable effects which are detected and measured as an indication of the presence of oil or salt water in the earth formations along the well bore.

It is well known to analyze earth formations in situ along the traverse of a bore hole through the use of various radioactivity analysis techniques. For example, it is possible to determine the presence of porous zones along the path of the bore hole through the use of techniques, sometimes referred to as porosity logging, to indicate the presence or absence of hydrogen in the pores of the formation, which hydrogen may be present in hydrocarbon oil or water. Such analysis may be carried on through the use of neutron-neutron or neutron-gamma logs in accordance with known techniques. Further, in accordance with the prior art, it has been proposed to determine whether or not salt water is present in the formations along the traverse of an earth bore by the use of nuclear chlorine logging techniques for analyzing for the presence of chlorine as a constituent thereof. This may be accomplished as set forth in U.S. Pat. No. 3,219,820, issued Nov. 23, 1965, to Hugh E. Hall, Jr. In accordance with the referenced patent a source of neutrons is passed through the bore hole and radiation in two energy ranges is detected to provide two signals. The first signal is a formation reference signal indicative of hydrogen, referred to in the patent as the hydrogen signal (H signal), and is substantially insensitive to chlorine in the logged formation. The second signal is a formation reference plus chlorine signal, referred to in the patent as the hydrogen plus chlorine signal (H + Cl signal), and is sensitive to chlorine in the logged formations as well as being indicative of hydrogen. The two signals are recorded or plotted in correlation with the position of the logging instrument in the bore hole in such manner that differences between the two signals provide a quantitative measure of the chlorine content of the formation and corresponding variations in the two signals provide a quantitative indication of the hydrogen content, (sometimes referred to as porosity) in the formation.

It is an object of the present invention to provide improvements in the methods and apparatus disclosed in the aforementioned Patent of Hugh E. Hall, Jr. It is another object of the present invention to provide improved well logging apparatus directed toward simultaneous determination of the hydrogen and chlorine contents of earth formations traversed by a bore hole and which utilizes a single proportional radiation detector with an associated multichannel pulse height analyzer.

It is still another object of the present invention to provide improved methods and apparatus for quantitatively distinguishing between hydrocarbon oil and salt water contained in the pores of an earth formation traversed by a bore hole and which is relatively insensitive to the adverse effect of certain other interfering substances which may also be present in the earth formations.

SUMMARY OF THE INVENTION

Briefly stated, the present invention involves improvements in neutron well logging methods and apparatus which may be embodied in a logging system comprising an instrument to be passed through a bore hole and which includes a neutron source for irradiating earth formations along the bore hole. Spaced a predetermined distance from the source along the longitudinal axis of the bore hole, there is provided a radiation detection unit comprising a proportional type radiation detector having coupled thereto a multi-channel pulse height signal analyzer system for providing signals proportional to radiation within at least two separate predetermined energy ranges, one of which, referred to as the Channel 1 or formation reference (FR) signal, is indicative of hydrogen and is substantially insensitive to the chlorine content of the formation and the other of which, referred to as the Channel 2 or formation reference and chlorine (FR Cl) signal, is indicative of both hydrogen and chlorine in the adjacent formations. Surrounding the radiation detector, there is provided a shield of pre-selected material having a relatively high capture cross-section for neutrons and characterized by having a significant thermal neutron induced gamma radiation response within the predetermined Channel 1 signal analysis range for the formation reference signal and having a relatively insignificant attendant gamma radiation response within the predetermined Channel 2 energy range for the formation reference plus chlorine signal upon the capture of a thermal neutron. In a preferred embodiment the preselected material of the shield comprises samarium, and in other embodiments it may comprise europium or gadolinium. In a preferred embodiment the shield of pre-selected material should surround the casing of the logging instrument in the vicinity of the detector in order to intercept the thermal neutrons which would otherwise be captured by the iron of the instrument casing with attendant emission of neutron capture gamma radiation characteristic of iron.

For additional objects and advantages and for a better understanding of the invention, attention is now directed to the following description and accompanying drawings. The features of the invention which are believed to be novel are particularly pointed out in the appended claims.

DETAILED DESCRIPTION OF THE INVENTION

Figure 1:
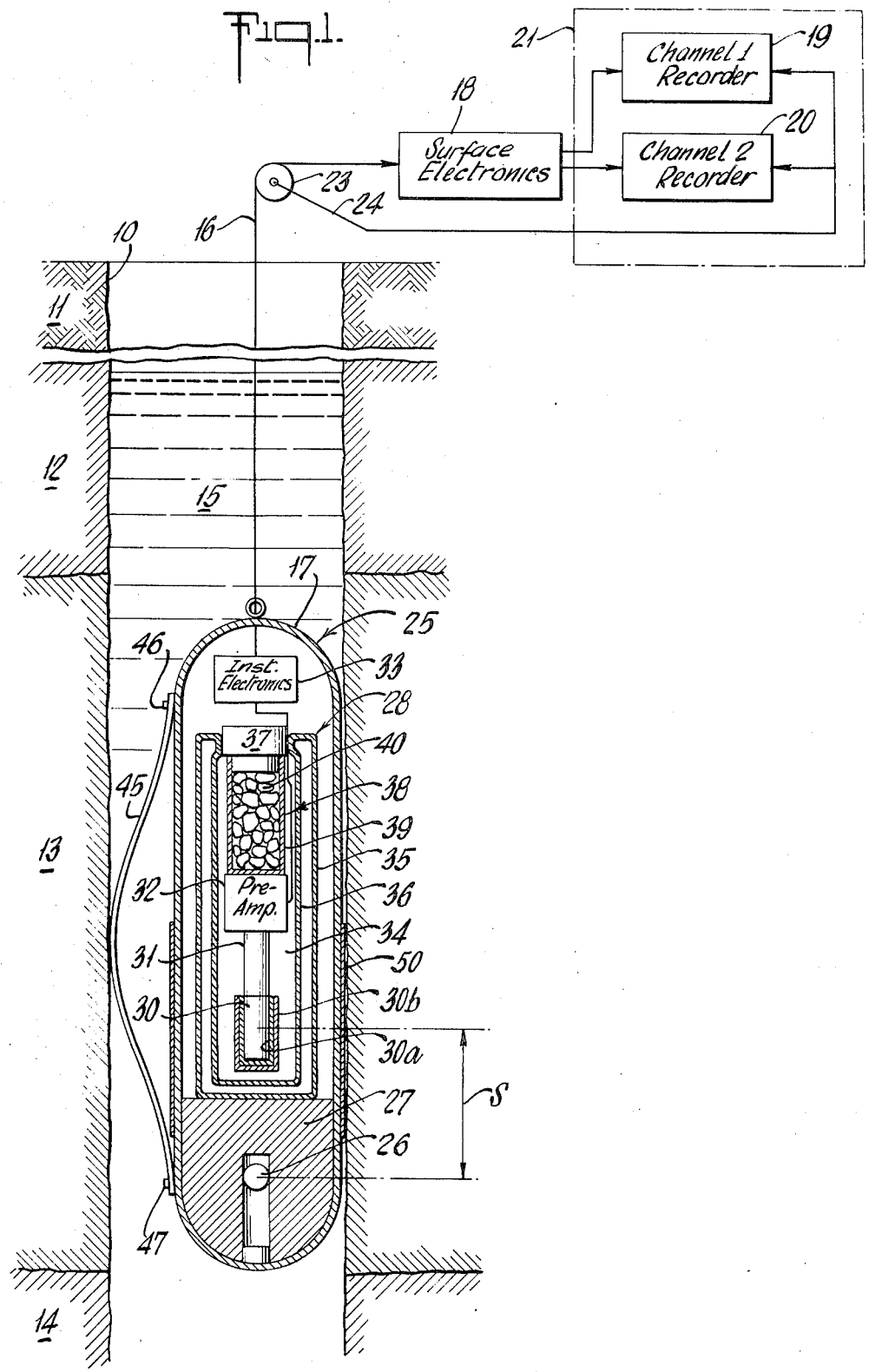
FIG. 1 is a schematic representation showing a vertical elevation through a portion of a bore hole having a well logging instrument suspended therein and which is constructed in accordance with principles of the invention.

Referring now to FIG. 1 of the drawings, there is shown a bore hole 10 traversing a plurality of earth formations 11, 12, 13 and 14 and containing a fluid 15, such as salt water, or crude oil, for example. Suspended within the bore hole 10, as by means of a cable 16, there is shown a well logging instrument 17 constructed in accordance with the principles of the invention. The cable 16 may include an outer conductive sheath together with one or more additional inner conductors (not individually shown) in order to afford means for transmitting electrical signals between the instrument 17 and electrical apparatus at the surface of the earth. The surface equipment comprises means designated Surface Electronics 18 for receiving signals transmitted from the logging instrument 16 and amplifying and segregating the received signals as necessary for recording purposes. The surface apparatus includes means for amplifying the received signals and a multi-channel pulse-height analyzer or discriminator having separate channel output paths for signals of different pulse height ranges. The output paths from the Surface Electronics 18 comprise separate signal channels, one of which is supplied to a first display device in the form of a Channel 1 recorder 19 and the other of which is supplied to a second display device in the form of a Channel 2 recorder 20. It is to be understood that the two recording devices may be separate recorders; however, they preferably comprise separate channels of a multi-channel recorder, as indicated by the dashed box 21 enclosing recording devices 19, 20. In any event, the recorders 19, 20 include ratemeter circuitry as necessary for providing a record of the intensity, i.e., rate-of-occurrence of detected radiation. It is also to be understood that although the discriminator is described as part of the surface equipment, it may be included as part of the equipment within the logging instrument 17.

In order to correlate the position of the logging instrument 17 in the bore hole 10 during the well log, there is provided at the surface a measuring apparatus 23, represented diagrammatically as a wheel having its perimeter in contact with the cable 16, for sensing movements of the cable 16 in and out of the bore hole 10. The measuring apparatus 23 may be any known device of this type suitable for determining the position of the logging instrument 17 in the bore hole 10 and may advantageously be of the type which provides an electrical output signal which may be transmitted as by means of the conductive circuit 24 to the recorders 19, 20 for correlating the recorded logging signal with the position of the logging instrument in the bore hole throughout the well log.

The logging instrument 17 comprises an elongated outer shell-like housing or casing 25 formed conventionally of steel in accordance with known techniques to withstand the pressures and temperatures commonly encountered in the well logging art. Advantageously, the housing should be of such character as to withstand the conditions that may be found in bore holes upwards of ten or twenty thousand feet in depth.

The casing 25 contains a neutron source 26 for irradiating the earth formations along the bore hole, together with appropriate radiation detection equipment for detecting gamma radiation induced in the formation as the result of irradiation by the source. Appropriate electrical circuitry is also enclosed within the casing for amplifying and otherwise handling the output signals from the radiation detection equipment for transmission over the cable 16 to the surface equipment. In particular, the neutron source 26 is shown positioned within the housing 25 and surrounded by a neutron-permeable shield 27 of lead, for example, to prevent gamma radiation which may also be emitted thereby passing either directly or indirectly to the detection equipment. The neutron source 26 is preferably one which has a relatively long half life to give stability and which is relatively free of attendant gamma ray emission; and, for example, may comprise the combination of beryllium with either actinium 227 or plutonium or radium D or polonium or americium. In the upper end of the instrument 17, spaced a predetermined distance from the source 26, there is positioned a radiation detection unit 28 which together with the associated shielding material and its associated circuitry is adapted and arranged to provide first and second output signals, the first of which is a reference signal indicative of the hydrogen of the surrounding formations but substantially insensitive to chlorine content and the second of which is proportional to the chlorine contents of the adjacent formations also. The signal derived over Channel 1 is proportional to radiation emitted from the adjacent earth formations as the result of interaction of neutrons from the source with the formation as discussed in detail below. The first signal is derived from the Channel 1 output of the discriminator and is hereinafter referred to as the formation reference signal. The second signal is derived over Channel 2 and is proportional to radiation emitted from the adjacent earth formation as a result of neutrons from the source and which is indicative of the hydrogen and chlorine contents of the adjacent formations and is hereinafter referred to as the reference and chlorine signal.

The detector unit 28 comprises a proportional scintillation detector including a gamma radiation sensitive luminophor 30, advantageously in the form of a thallium-activated sodium iodide crystal, together with a photomultiplier tube 31 shown mounted adjacent to luminophor 30 for detecting the photon output pulses from the luminophor and providing an electrical signal proportional thereto. The photomultiplier tube is shown adjacent to a preamplifier 32 which, in turn, is shown electrically connected to additional electrical equipment identified as Instrument Electronics 33, including an amplifier (not individually shown), for transmission of an output signal derived from the photomultiplier tube 31 to the surface equipment by means of the cable 16. It is to be understood that the photomultiplier tube 31 is energized by means of a high voltage source (not shown) which may comprise batteries positioned in the logging instrument, or, more conventionally, may involve the use of power supply equipment including a transformer and rectifier in the logging instrument for deriving appropriate direct-current operating potential from electric power transmitted as alternating-current from the surface to the logging instrument in the bore hole. It is to be further understood that the Instrument Electronics 33 may actually include any additional circuitry required for handling the transmission of the signal information to the surface in accordance with principles well-known in the art. For example, the radiation detector signals may be transmitted to the surface as amplitude-modulated signals, or may be transmitted in the form of frequency-modulated signals, in accordance with well-known techniques. If a so-called single conductor cable is employed, the respective signals from the separate detector channels may be transmitted simultaneously as pulses of different polarity or different pulse height, or as signal information frequency-modulated on carriers of different frequency, for example.

The luminophor 30 is shown mounted within a conventional aluminum container 30a which serves to protect it from moisture and physical damage. The luminiphor 30 is also preferably surrounded with a thin boron shield 30b which may be located around the outside of the container 30a, for absorbing thermal neutrons to prevent activation of the luminophor 30. The upper end of the container 30a facing the photomultiplier 31 is also shown as open, with the luminophor 30 in direct contact with the photomultiplier 31. However, it is to be understood that the container 30a may be sealed with a transparent cover of glass or plastic in a manner known in the art. Surrounding the casing 25 of the logging instrument 17 in the vicinity of the detector including the luminophor 30 in the container 30a there is provided a shield 50 of a neutron-absorbing material, such as samarium in the form of a coating of samarium oxide ($Sm_2O_3$), and preferably is included in a binder or matrix of epoxy resin. The samarium shield 50 is a neutron-absorbing material which emits gamma radiations within the Channel 1 detector energy range upon capturing a neutron and, as hereinafter discussed, functions in combination with other elements of the invention including the multi-channel discriminator to render a neutron-gamma radiation signal (formation reference signal) derived by Channel 1 primarily sensitive to hydrogen and relatively insensitive to the effect of chlorine, as discussed in detail below.

In order to insure that the Channel 1 signal is responsive mainly to the neutron-induced gamma radiation and not the undesirable lower energy natural gamma radiation or scattered gamma radiation from the neutron source, the Channel 1 discriminator should advantageously be biased to exclude a large proportion of these undesirable lower energy gamma radiations. Preferably, the discriminator should be biased so that the measured radiation signal is indicative of gamma radiation in a range having an energy of about 1.3 million electron volts (MEV) and above, as will be discussed later. This particular bias level, in combination with the 2 × 4 inches sodium iodide crystal and a samarium oxide in epoxy shield for the neutron-absorbing material 50 which surrounds the luminophor 30 at a source-to-detector spacing of 15.75 inches operates to provide a very satisfactory formation reference logging signal which is primarily responsive to the hydrogen in the formations, due to radiation resulting from irradiation of the formations by neutrons from the source 26. Moreover, by thus biasing the detector or exclude lower energy gamma rays, most of the natural gamma radiation present in the formation and any gamma radiation scattered from the source is likely to be eliminated from the detected signal, since the natural and scattered gamma radiations are both of relatively low energy level.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the moderating effect of hydrogen, and after being slowed to the thermal range the neutrons are captured by material of the formation with the resultant emission of gamma rays. These neutron-gamma rays are detected and their intensity, i.e. rate-of-occurrence is measured as a measure of the hydrogen content (also referred to herein as porosity) of the information When the thermalized neutrons are captured by hydrogen, characteristic gamma radiations are emitted by the hydrogen responsible for the capture. When only hydrogen is present in the pores of the region under investigation, the intensity, i.e. rate-of-occurance of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 Barns, whereas hydrogen has a neutron capture cross-section of about .33 Barns. Thus, chlorine is approximately 100 times more effective in capturing thermal neutrons than hydrogen. When a thermal neutron is captured by chlorine, rather than hydrogen, about 3.1 gamma rays (on the average) are emitted per capture as compared with one gamma ray per capture by a hydrogen atom. In addition to the foregoing, many of the gamma rays emitted by chlorine are of higher energy range, from about 4–8 MEV., than the characteristic 2.2 MEV. gamma rays of capture emitted by hydrogen. In view of the foregoing the presence of even a small amount of chlorine will ordinarily increase the intensity of the gamma radiation detected by the neutron-gamma ray instrument, thus giving a false indication of hydrogen content in the resultant log.

The neutralization of the adverse effect of chlorine upon the neutron gamma ray hydrogen or formation reference signal of Channel 1 described above is accomplished by subjecting the gamma radiation detector to radiation which varies inversely with the effect upon the detector due to the presence of chlorine. Chlorine has a relatively high capture cross-section and emits a plurality of gamma rays (photons) ih response to the capture of each neutron. Thus, the counting rate of the gamma radiation detector is increased due to the presence of chlorine. In order to neutralize the effect of chlorine a gamma radiation signal is developed whose intensity decreases correspondingly due to the presence of chlorine. This may be accomplished by developing a gamma radiation signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material such as samarium which emits a plurality of neutron capture gamma radiations in the vicinity of the detector, thermal neutrons are absorbed in said material which result in the emission of gamma radiation which is detected by the gamma radiation detector. Using a sodium iodide detector, the thickness of samarium oxide needs to be at least enough to absorb most of the thermal neutrons and the balance is achieved by adjusting the Channel 1 discriminator bias. When the logging instrument passes into a region containing chlorine from an identical region with the exception that no chlorine is present, the counting rate of the gamma radiation detector tends to increase due to the increase of the number of capture gamma rays (photons) directly attributable to the chlorine. However, when this occurs, the number of thermal neutrons available for capture by the neutron absorbing material around the detector is reduced thus tending to decrease the counting rate in the gamma radiation detector. By suitable means, these two effects may be made to cancel one another, so that when a logging tool using this system is passed from a formation containing chlorine to one not containing chlorine but having the same porosity, formation matrix, and hydrogen content, the response remains constant.

The samarium acts as a neutron absorber and gamma radiation radiator and thus samples the thermal neutron flux in the vicinity of the NaI(Tl) detector. Most of the samarium gamma rays are of relatively low energy and many of these contribute to the formation reference signal which is measured in Channel 1 preferably by setting the discriminator to accept all gamma rays detected in a range between 1.30 and 2.92 MEV.

The formation reference and chlorine signal is obtained in Channel 2 by measuring all gamma rays with energies above a lower limit of 3.43 MEV. This includes gamma rays from iron, calcium and silicon, as well as chlorine, whereas, the formation reference signal of Channel 1 also contains gamma rays from hydrogen and the samarium sleeve.

In the apparatus shown in FIG. 1, the abovementioned two effects for neutralizing the influence of chlorine on the formation reference signal of Channel 1 may be made equal and opposite either by adjusting the bias of the discriminator, by adjustment of the amount of the neutron-absorbing material 50, or by a combination of the first two techniques. For example, the neutron-absorbing material 50 may be a coating of samarium oxide surrounding the logging instrument and crystal at such a thickness that it essentially captures all of the thermal neutrons which diffuse the layer of samarium oxide. The rise in the capture gamma component can be balanced against the thermal neutron component by Channel 1 discriminator settings of 1.30 to 2.92 MEV. for a source-to-detector spacing of 15¾ inches. The lower limit of the Channel 1 discriminator bias will be in the range from 0.8 to 1.8 MEV. depending upon the detector-to-source spacing, the dimension of the crystal, the case thickness, the case material, the diameter of the bore hole and the salinity of the fluid.

At lower bias settings, there is more thermal neutron component than is necessary, and at higher bias settings there is less than needed. Thus, in accordance with one aspect of the invention the lower Channel 1 bias may be set, for example, at 1.0 MEV. and the thickness of the samarium oxide shield 50 adjusted to vary the amount of samarium so that the two effects cancel. If this is done, one should place an additional neutron-absorbing material between the crystal and the samarium, such as boron or lithium, sufficiently thick to absorb the thermal neutrons transmitted through the samarium. This is desirable since neither boron nor lithium emit neutron capture gamma rays above 1.0 MEV. and the crystal would not become activated by thermal neutrons. This aspect may be carried out by the addition of a layer of neutron-capturing material, such as boron, between the neutron interaction material 50 and the luminophor 30.

While samarium is preferred as the material for capturing the thermal neutrons in the vicinity of the detector in order to neutralize the effect of chlorine upon the Channel 1 formation reference signal, it is to be understood that other materials may be employed rather than samarium, and that other materials may be employed together with samarium. In the present case, where the samarium is employed in a logging instrument having a steel instrument casing or housing, the sleeve of material such as samarium will substantially diminish iron capture gammas from the logging signal. It is noted that the iron of the logging instrument has a thermal neutron capture cross-section of 2.43 Barns as compared with a capture cross-section of about 5,800 Barns for samarium. Iron emits neutron capture gamma rays ranging up to 9.3 MEV., whereas samarium emits gammas up to 7.89 MEV. upon capture of thermal neutrons.

Europium or gadolinium may also be employed in carrying out the invention. Gadolinium has a capture cross-section of 47,000 Barns and emits neutron capture gammas up to 7.78 MEV. As mentioned above, chlorine, the effect of which is to be balanced out of the resultant detected gamma ray signal, has a capture cross-section of of about 32 Barns and produces neutron capture gamma rays up to about 8.56 MEV.

Whether samarium or other material having similar characteristics or a combination of such materials is employed, such as the combination of samarium with the steel logging casing, it is important that the sum total of such material used have a predetermined net effect which results in the development of a gamma ray signal in response to the thermal neutron population in the immediate vicinity of the detector which just cancels out the capture gamma effect due to the presence of chlorine in the bore hole and formation in the vicinity of the detector.

In the preferred embodiment employing a neutron source of $10^7$ neutrons per second intensity comprising plutonium beryllium, a thallium-activated sodium iodide crystal radiation detector of 4 inches length and a 2 inches diameter spaced from the neutron source a distance of 15¾ inches, center to center, it has been found that with a steel logging casing surrounded by a samarium oxide sleeve in the vicinity of the detector very satisfactory cancellation of the adverse effects of chlorine on the formation reference signal of Channel 1 may be achieved with the Channel 1 bias set to detect only gamma radiation in the range of 1.30 to 2.92 MEV. as discussed above.

In the preferred embodiment the Channel 1 bias in the range of 1.3 to 2.92 MEV. provides not only optimum neutralization of the influence of chlorine in the formation reference signal, but also minimizes other adverse lithology effects on the detected signal. It is possible, however, to achieve reasonably satisfactory operation when the Channel 1 bias range is varied slightly, for example, the Channel 1 bias may be extended approximately to the range of 1.0 to 3.0 MEV.

Likewise, the Channel 2 bias, while preferably set at the specified range of 3.43 MEV. and above for optimum elimination of adverse effects due to lithology, may in less precise circumstances be varied so that radiation of about 4.5 MEV. and above is detected. The upper limit of the Channel 2 bias does not have a specific cut-off value, it being set to accept the full neutron gamma spectrum above the specified lower limit (preferably 3.43 MEV.). It is to be understood that the neutron gamma spectrum, as a practical matter, extends upward to about 8 or 9 MEV. so that the significant upper limit of the Channel 2 bias might, in a given case, be set in this general range. In any event, it is important that the Channel 2 bias be set so as to detect the most prevalent neutron gamma radiation resulting from the capture of thermal neutrons by chlorine in the formation. This is achieved with the Channel 2 bias settings described above.

It is important that the sleeve or shield of neutron reactive material around the detector have a relatively large capture cross-section for thermal neutrons and have a neutron capture gamma spectrum which lies predominantly within the Channel 1 bias range and outside of the Channel 2 bias range. It is important that the shield of material, such as samarium, have a capture gamma spectrum clearly different from the capture gamma spectrum for chlorine, so that the higher energy chlorine capture gamma radiation can be detected in Channel 2 and excluded from Channel 1 and so that the predominant neutron capture gamma radiation emitted by the sleeve can be detected in Channel 1 and excluded from Channel 2. By thus combining these various features it is possible to provide the desired optimized chlorine system described herein.

In order to stabilize and protect the scintillation logging equipment against the effects of high bore hole temperatures and variations thereof, the luminophor 30 and photomultiplier tube 31, as well as the preamplifier 32, are all shown mounted within an insulated chamber 34 preferably in the form of a Dewar flask comprising an outer wall 35 separated from an inner wall 36 by an evacuated space. The insulated chamber 34 is provided with an appropriate removable insulating cover plug 37 within the neck of the insulating chamber 34 comprising the Dewar flask. Advantageously affixed to the inside of the insulated cover plug 37, there is provided a coolant chamber 38 having a wall structure 39 formed of thermally conductive material such as thin aluminum, and containing a quantity of ice 40. The coolant chamber 38 including the ice 40 affords means for maintaining the scintillation detection equipment within the insulating chamber 34 in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted Feb. 18, 1958 to Gerhard Herzog.

In order to enhance the sensitivity of the formation reference and chlorine signal of Channel 2 to chlorine, the discriminator circuitry associated with Channel 2 should be biased to detect gamma radiation above 3.43 MEV. in order that the detected gamma rays of Channel 2 will significantly indicate the higher energy gamma rays caused by the presence of chlorine in the formation irradiated by neutrons from source 26.

Despite the elimination of the 2.2 MEV. hydrogen capture gamma rays from the Channel 2 signal (due to the 3.43 MEV. bias limit) it is to be understood that the gamma radiation detected by the formation reference and chlorine signal of Channel 2 will be proportional to the hydrogen content of the formation as well as the chlorine content. Fast neutrons from the source must be moderated, i.e., slowed to the thermal range, before being captured to cause emission of neutron-induced gamma rays. The hydrogen sensitivity of the formation reference and chlorine signal channel is due to the fact that hydrogen, which is the lightest of the elements, is primarily responsible for moderating or thermalizing the fast neutrons from the cource. The chlorine sensitivity of the Channel 2 signal is due in large measure to the fact that the measured gamma ray flux is emitted due to capture of the thermal neutrons by chlorine.

In order to stabilize the position of the logging instrument throughout the logging run, there is provided a decentralizing bow spring 45 having its upper and lower ends 46 and 47 mounted to the logging instrument 17 in such manner that the spring is free to flex as the instrument is moved past irregularities in the side of the bore hole 10. Conventionally this may be achieved by mounting the upper and lower ends of the bow spring 45 in slidably engageable relationship to the instrument 17, as by means of elongated slots (not shown) in the bow spring 45.

Figure 3:
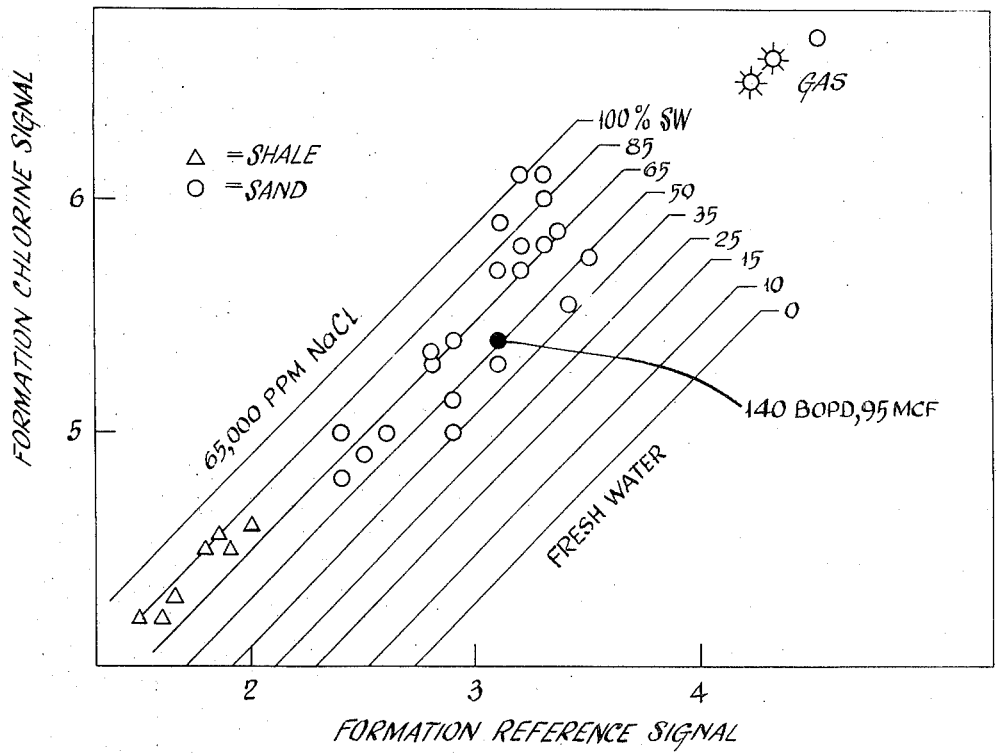
FIG. 3 is a graphical plot illustrating a procedure for interpretation of logging information obtained in accordance with the present invention.

Nuclear chlorine logging systems are based on the thermal neutron capture cross-section of chlorine, which is an order of magnitude larger than those of other major elements occurring in earth sediments. In accordance with the present invention two measurements are made continuously and simultaneously by the chlorine logging system versus depth as logs representing a formation chlorine (FR Cl) signal (also referred to herein as the formation reference and chlorine signal) and a formation reference (FR) signal, respectively. Interpretation for chlorine content and formation water saturation are made by comparison of these two curves which are different functions of the chlorine content of the measured formations. Comparison and interpretation are usually made by either overlaying both curves and observing the deviation of the FCl from the FR curve or by crossplotting in Cartesian coordinates. For the cross-plot method, a pattern as shown in FIG. 3 evolves. All points representing the various reservoir formations of a logged interval fall on or between two nearly parallel curves. These two curves are the loci of formation with the highest and lowest formation fluid salinity, i.e., saltwater filled and fresh water or oil filled formations. Zones of intermediate fluid salinity plot between these curves. Curves of intermediate salinity can be constructed between those of highest and lowest salinity and it is then possible to assign a fluid salinity to each of the logged formations.

Ideally, the measured formation salinities should not be affected by formation porosity, shalyness (boron content) and lithology.

The present system measures thermal neutron capture gamma radiation in two gamma ray energy ranges, 1.3 to 2.92 MEV. and all gamma ray energies above 3.43 MEV. The detector is a 2-inch diameter to 4-inch long NaI(Tl) scintillation detector which is spaced 15 ¾ inches (center to center) from a $10^7$ neutron per second plutoniun beryllium neutron source. Lead is used as shielding material between neutron source and detector. Source and detector are contained in a steel housing covered with a samarium oxide ($Sm_2O_3$) sleeve. The $Sm_2O_3$ sleeve in combination with the above gamma ray energy ranges accounts for an effective elimination of the porosity and shale (boron) effect on water saturation measurements. The effect of lithology is also minimized.

Figure 4:
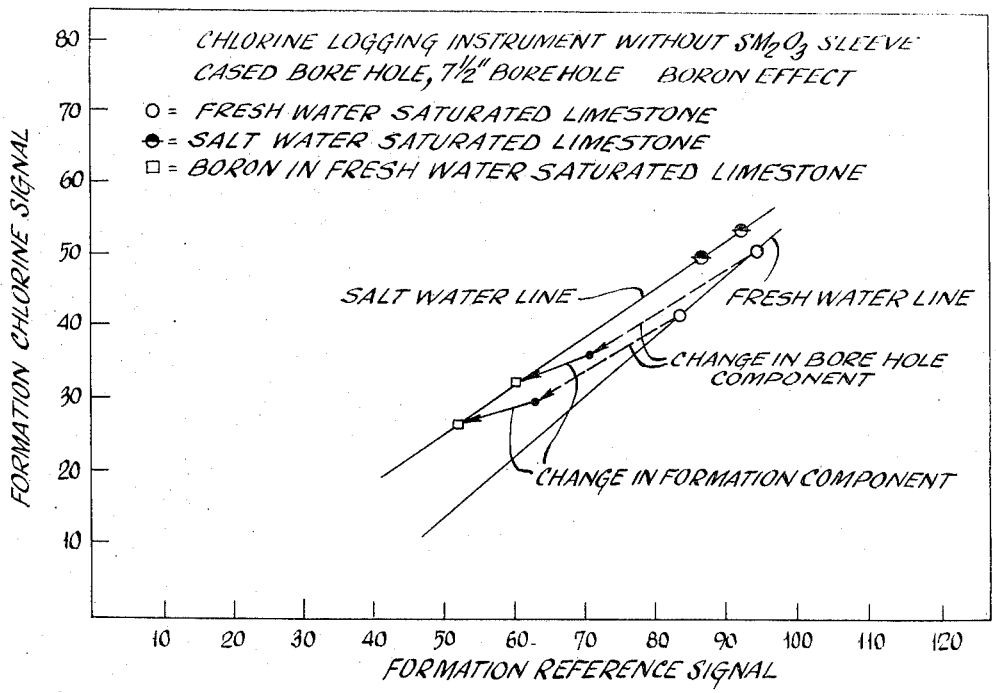
FIG. 4 is a plot illustrating the response of apparatus in accordance with the present invention, but without the provision of a shield of the pre-selected material such as samarium.

In FIG. 4 the response of illustrated embodiment of the present chlorine system, but without the $Sm_2O_3$ sleeve, is plotted for cased limestone formations of medium and high porosity. This figure shows the effect of boron in the formation on the log. The net effect is the result of changes in the bore hole component and the formation component which add vectorially to give a false indication of salt water in a formation which is filled with fresh water.

Figure 5:
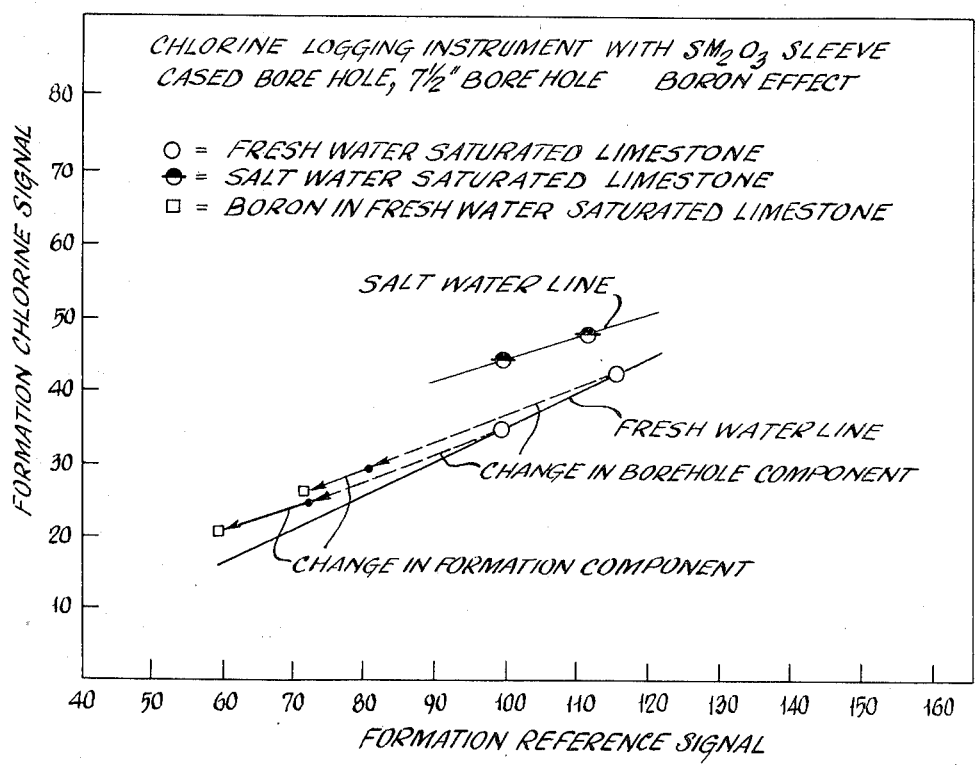
FIG. 5 is a plot of the response of a logging system in accordance with the present invention, including a shield of pre-selected material namely samarium oxide, for the same formations as in the case of FIG. 4.

In both FIGS. 4 and 5, the same symbols are used to designate fresh water saturated limestone, salt water saturated limestone and boron in fresh water saturated limestone.

In FIG. 5 the response of the same system with an $Sm_2O_3$ sleeve is shown for the same formations as in FIG. 4. In this figure it can be seen that the addition of boron does not appreciably alter the indication of fresh water or oil in the formation. This characteristic is achieved by the vectors representing the change in bore hole and the change in formation component being parallel to each other and in the direction of an apparent porosity increase.

It should be noted that in both FIGS. 4 and 5 the direction of the formation component vector is the same and the direction of the bore hole component vector has been rotated into the direction of the formation component vector by the addition of the $Sm_2O_3$ sleeve in the case of FIG. 5. It should be noted that in FIG. 5, in contrast to FIG. 4, both the bore hole and formation boron addition vectors are parallel to the salt water and fresh water lines.

The function of the $Sm_2O_3$ sleeve is to convert thermal neutrons near the detector into gamma rays which can be detected by the NaI(Tl) scintillator.

Figure 6:
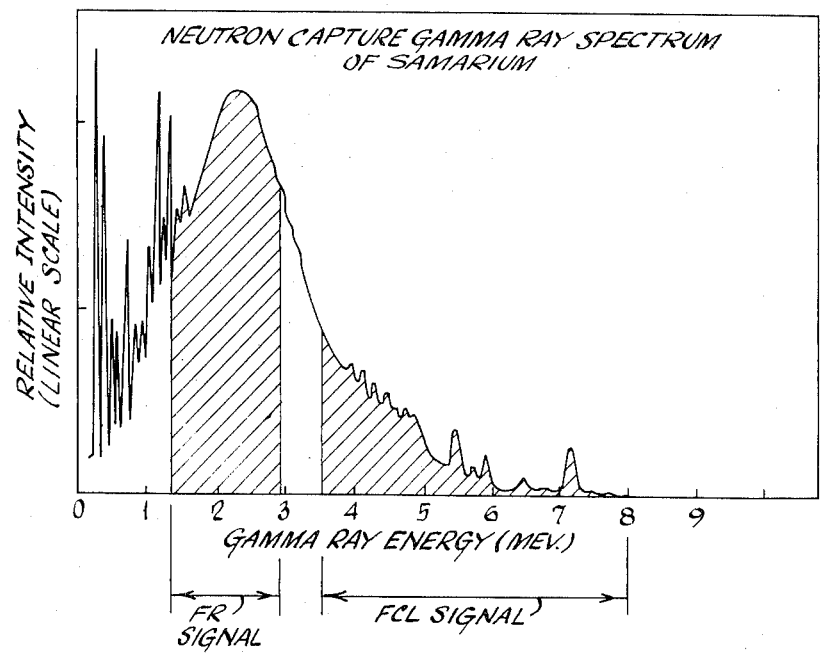
FIG. 6 is a graphical showing of the shape of the samarium capture gamma ray spectrum.

The shape of the samarium capture gamma ray spectrum is shown in FIG. 6. From this figure it can be seen that a large proportion of the samarium gamma rays fall within the 1.3 to 2.92 MEV. range of the FR signal and fewer fall within the range of the FCl signal. Since the NaI(Tl) detects the higher energy gamma rays with less efficiency, the number of samarium gamma rays counted in the 1.3 and 2.92 MEV. range is about ten times greater than in the range above 3.43 MEV. Other elements which have a larger capture cross-section and a thermal neutron capture gamma spectrum similar to samarium are europium, gadolinium and other rare earth elements. The thickness of the sleeves made from these elements should be sufficient to capture the majority of the incident thermal neutrons.

In order to conduct a radioactivity well log for determining quantitatively as well as qualitatively the chlorine contents of earth formations traversed by the bore hole, the percentage salinity of the water contained in the well bore and formations should preferably be determined either by the taking of samples or at least by reference to some previously determined information indicating the expected salinity. The salinity information provides reference data for calibrating and adjusting logging equipment and for evaluating the logging record which is obtained.

The logging instrument may be calibrated for a well having a given chlorine saturation by positioning the logging instrument opposite a zone in the formation known to be 100 percent saturated with salt water, or some other known fraction thereof, and noting the measured radiation response. Advantageously, the response then may be adjusted to some desired position on the chart. Similarly, the instrument should be positioned opposite a zone in the formation having 100 percent oil saturation, or some known percentage thereof, preferably the same percentage as that chosen for the calibration of the salt water response, and the instrument should then be adjusted so that the logging chart indicates a desired value. Advantageously, to facilitate interpretation, the recording equipment of the logging system should be adjusted so that the Channel 1 formation reference signal and the Channel 2 formation reference and chlorine signal track in formations of varying porosities. This assures that both reference signal detection equipment and the reference plus chlorine signal detection equipment are substantially equally sensitive to hydrogen content (porosity), whether present as a constituent of oil or water. Then, with the instrument positioned opposite a zone containing salt water, any difference between the two signals will be due to the presence of chlorine as a constituent of salt water. With the apparatus thus calibrated, the indicated reference or porosity signal indicates the oil or water content of the formation, while any separation or deviation between the reference signal and the reference and chlorine signal indicates that the formation reference or porosity signal is due to salt water, to an extent proportional to the deviation between the two signals. When the formation reference signal indicates a high porosity, e.g., concentration of hydrogen, while the reference and chlorine signal is substantially coincident therewith, there is a good indication that oil is present in the formation and the exact quantity thereof is also shown. When the reference signal indicates a high value, but with the reference and chlorine signal being widely separated therefrom, there is provided an indication that the formation is largely filled with salt water, with the degree of separation between the two signals indicating the quantity of salt water in relation to the total saturation.

Figure 2:
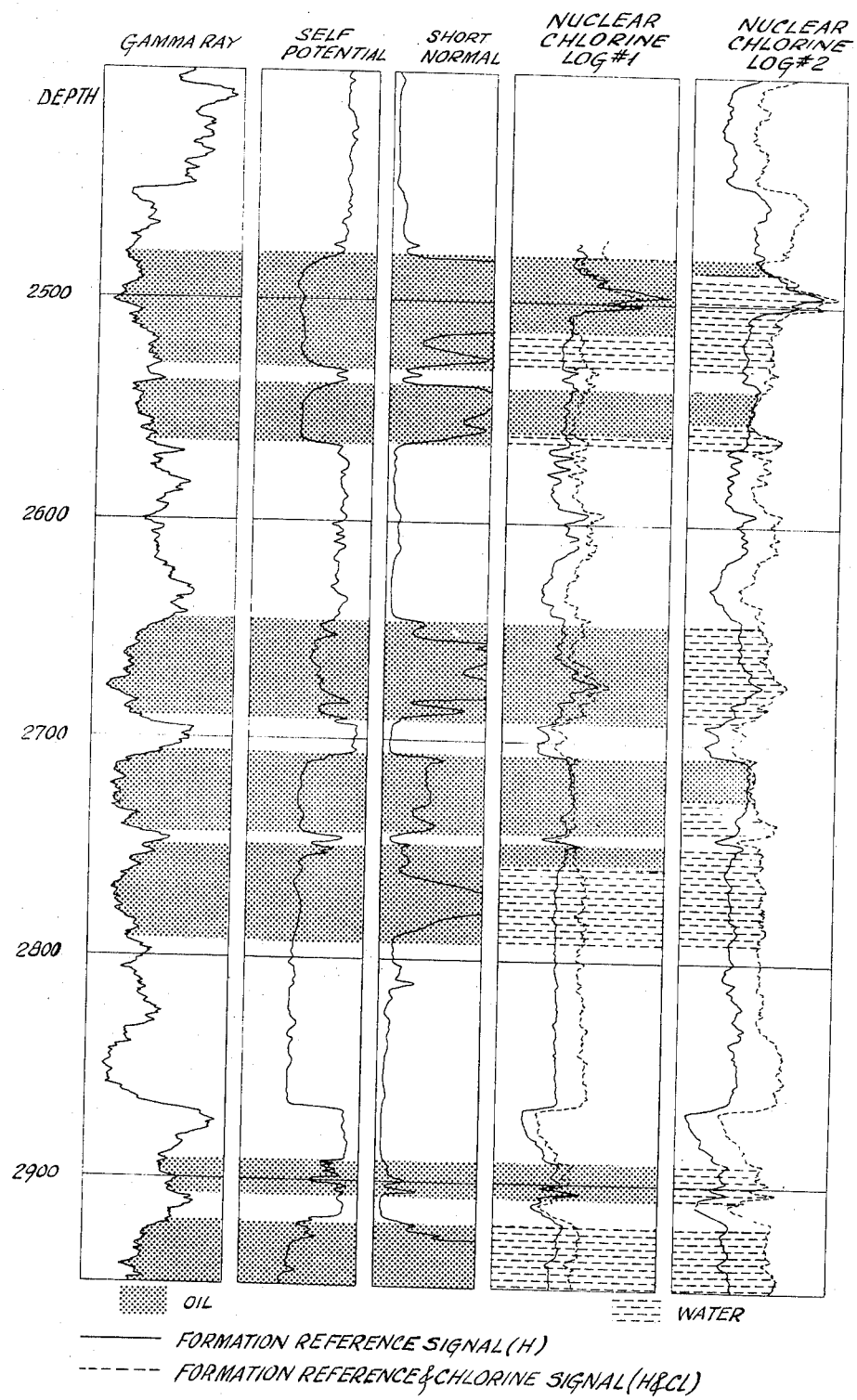
FIG. 2 is a diagrammatic representation of a typical logging record which may be made in accordance with the teaching of the present invention.

Referring now to FIG. 2, there is shown a cross-section of a plurality of earth formations typical of those which can be traversed by a bore hole and logged with a logging instrument 17 in accordance with the invention, such as that shown in FIG. 1. Plotted alongside the diagram of the earth formations, there are shown typical natural gamma ray, self potential and short normal resistivity logs of the adjacent earth formations. Also shown are two nuclear chlorine logs which are typical of logs that can be made by the instrument 17. For purposes of illustration it is assumed that the second chlorine log was run some time after the first one, and that the oil-water contact has changed in the interim, for example, due to depletion, as discussed hereinafter. This record shows a first trace H showing radiation intensity measured in Channel 1 (increasing to the right as seen in the record) and representative of the hydrogen content of the formation and a second trace H & Cl showing radiation intensity measured in Channel 2 (also increasing to the right as seen in the record) and indicative of both the hydrogen and chlorine contents of the earth formations. The response of the H trace indicates the quantity of hydrogen, i.e. porosity of the formation. Regions of corresponding deviations of the two traces indicate the presence of oil or fresh water and regions where the H and Cl signal exceeds the H signal indicate the presence of salt water. Thus, in the region just below 2705 feet there is an indication of oil, or possibly fresh water. Over a period of time the oil-salt water content at the bottom of this zone has moved from 2760 feet shown on the first chlorine log to 2725 feet shown on the second log run at a later time. In the region just below 2920 feet there is an indication of salt water saturation. In the region just below 2490 feet there is an indication of low porosity with both H and H & Cl being relatively low in value. In the region just below 2650 feet, on the first chlorine log there is an indication that may be interpreted as a mixture of both salt water and oil, which on the second log may be interpreted as salt water only.

Although the two logging signals indicating the hydrogen content and hydrogen and chlorine content, respectively, are shown recorded on the same chart, it is to be understood that they may be recorded as individual traces on separate logging charts, with the two records being interpreted by overlaying one with respect to the other in order that corresponding variations and differences between the respective logs may be interpreted. In such case it is to be understood that the logging system would be adjusted so that the two logging signals show deviations on the same scale of value.

It is also contemplated that, instead of recording both the hydrogen and the hydrogen and chlorine signals individually, only one of the two signals, preferably the hydrogen content signal, may be recorded together with a second correlated signal showing the ratio or difference between the hydrogen and hydrogen and chlorine signals.

It is also noted that the hydrogen content signal may be plotted versus the hydrogen and chlorine content signal in which case a straight line indication will be given for oil or fresh water, with deviations therefrom indicating the chlorine content.

It is to be understood that the Channel 1 and 2 logging signals may be recorded magnetically and may be submitted to a computer either in analog or digital format, wherein appropriate mathematical or computer techniques may be employed to provide a resultant signal representing difference or otherwise showing variations between the Channel 1 and 2 signals, or which may be a plot of one against the other.

In order to conduct a logging run with the herein disclosed apparatus the instrument 17 is preferably lowered below the region of the well to be logged and drawn upwardly through the well at a predetermined constant rate while the outputs of the two detector channels are transmitted over the cable 16 to the surface equipment where they are supplied to the recorder. The intensity, i.e. rate-of-occurrence of the detected radiation in each of the two channels is recorded in correlation with the location of the logging instrument in the bore hole.

Obviously, many modifications and variations of the invention, as hereinbefore set forth, may be made without departing from the spirit and scope thereof, and therefore only such limitations should be imposed as are indicated in the appended claims.

We claim:

1. Apparatus for conducting a radioactivity well log comprising an instrument adapted to be passed through a bore hole traversing a plurality of earth formations, said instrument including means comprising a source of fast neutrons for irradiating the earth formations along the bore hole and a radiation detector for detecting radiation resulting in the bore hole due to said irradiation of the formations by neutrons from said source, said radiation detector comprising a proportional gamma radiation detector having a multichannel pulse height analyzer associated therewith including first and second channels for providing output signals in at least two energy ranges, the first of said energy ranges corresponding to gamma radiation 1.3 MEV to about 3.0 MEV, and the second of said ranges corresponding to gamma radiation from about 4 MEV upward to include at least the dominant higher energy chlorine neutron capture gamma radiation, a shield of preselected material substantially surrounding the active volume of said detector of said logging instrument, said preselected material having a relatively high capture cross-section for thermal neutrons and having a characteristic neutron capture gamma radiation emission predominantly within the energy range of said first channel and substantially outside the range of said second channel, whereby the signal derived from said first channel comprises a formation reference signal largely indicative of hydrogen, and whereby the signal derived from said second channel comprises a formation reference and chlorine signal largely indicative of both hydrogen and chlorine.

2. Apparatus as defined in claim 1, wherein the preselected material of said shield is samarium.

3. Apparatus as defined in claim 1, wherein the preselected material of said shield is gadolinium.

4. Apparatus as defined in claim 1, wherein the preselected material of said shield is europium.

5. Apparatus as defined in claim 1, wherein said logging instrument includes a casing containing at least the radiation-sensitive portion of said gamma radiation detector and wherein said shield of preselected material substantially surrounds at least that portion of said casing containing the radiation-sensitive portion of said detector.

6. Apparatus as defined in claim 5, wherein the preselected material of said shield comprises samarium oxide contained in a binder.

7. Apparatus as defined in claim 6, wherein said samarium oxide is contained in an epoxy-resin binder.

8. Apparatus as defined in claim 1, wherein the first of said energy ranges corresponds to gamma radiation of 1.3 to 2.92 MeV and wherein the second of said energy ranges corresponds to gamma radiation of from about 3.43 MeV upward to at least about 8 MeV.

9. Apparatus as defined in claim 8, wherein the radiation-sensitive portion of said detector is a thallium-activated sodium iodide luminophor.

10. Apparatus as defined in claim 8, wherein said sensitive portion of said detector is spaced from said source along the longitudial axis of said instrument corresponding to the normal direction of travel of said instrument through the bore hole, and wherein the distance from the center of said source to the sensitive portion of said detector is substantially 16 inches.

11. In the method of conducting a radioactivity well log of earth formations traversed by a bore hole by passing a source of fast neutrons through the bore hole to irradiate said formations at successive locations along the bore hole and simultaneously passing a proportional gamma radiation detector through the bore hole for detecting gamma radiation in said bore hole resulting from said irradiation, the improvement involving maintaining around said detector a shield of preselected material for intercepting and capturing thermal neutrons and characterized by emission of neutron capture gamma radiation substantially within a first energy range corresponding to gamma radiation of substantially 1.3 MEV to 3.0 MEV while deriving a first logging signal from said detector corresponding to gamma radiation in said first range and which results from gamma radiation impinging upon said detector in said bore hole due to both gamma radiation resulting from said neutron irradiation of earth formations along the bore hole and the emission of neutron capture gamma radiation from said shield around said detector, and deriving a second logging signal from said detector corresponding to gamma radiation in a second range extending from about 4 MEV upward to include at least the dominant higher energy chlorine neutron capture gamma radiation and plotting said first and second logging signals in correlation, whereby corresponding portions of said signals are indicative of hydrogen in said formations and differences in said two signals are indicative of chlorine in said formations.

12. Apparatus for conducting a radioactivity well log comprising an instrument adapted to be passed through a bore hole traversing a plurality of earth formations, said instrument including means comprising a source of fast neutrons for irradiating the earth formations along the bore hole, and a radiation detector for detecting radiation resulting in the bore hole due to said irradiation of the formations by neutrons from said source, said radiation detector comprising a proportional gamma radiation detector having a multichannel pulse height analyzer associated therewith for providing output signals in at least first and second channels corresponding, respectively, to first and second energy ranges, a shield of preselected material substantially surrounding the active volume of said detector of said logging instrument, said preselected material having a relatively high capture cross section for thermal neutrons and having a characteristic neutron capture gamma radiation emission spectrum predominantly within said first energy range and substantially outside said second energy range, said first energy range including a significant part of the neutron capture gamma spectrum of chlorine and having a lower limit of about 1 MEV or above and having an upper limit below said second range, said second range including a significant portion of neutron capture gamma spectrum of chlorine and having a lower limit above said first range, whereby the signal derived from said first channel comprises a formation reference signal largely indicative of hydrogen, and whereby the signal from said second channel comprises a formation reference and chlorine signal largely indicative of both hydrogen and chlorine.

13. Apparatus as defined in claim 12 wherein the preselected material of said shield is samarium.

14. Apparatus as defined in claim 12, wherein the preselected material of said shield is gadolinium.

15. Apparaus as defined in claim 12, wherein the preselected material of said shield is europium.

16. Apparatus as defined in claim 12, wherein said logging instrument includes a casing containing at least the radiation-sensitive portion of said gamma radiation detector, and wherein said shield of preselected material substantially surrounds at least that portion of said casing containing the radiation-sensitive portion of said detector.

17. Apparatus as defined in claim 16, wherein the preselected material of said shield comprises samarium oxide contained in a binder.

18. Apparatus as defined in claim 17, wherein said samarium oxide is contained in an epoxy-resin binder.

19. Apparatus as defined in claim 12, wherein the first of said energy ranges corresponds to gamma radiation of 1.3 to 2.92 MeV, and wherein the second of said energy ranges corresponds to gamma radiation of from about 3.43 MeV upward to at least about 8 MeV.

20. Apparatus as defined in claim 19, wherein the radiation-sensitive portion of said detector is a thallium-activated sodium iodide luminophor.

21. Apparatus as defined in claim 19, wherein said sensitive portion of said detector is spaced from said source along the longitudial axis of said instrument corresponding to the normal direction of travel of said instrument through the bore hole, and wherein the distance from the center of said source to the sensitive portion of said detector is substantially 16 inches.

22. In the method of conducting a radioactivity well log of earth formations traversed by a bore hole by passing a source of fast neutrons through the bore hole to irradiate said formations at successive locations along the bore hole and simultaneously passing a proportional gamma radiation detector through the bore hole for detecting gamma radiation in said bore hole resulting from said irradiation, the improvement involving maintaining around said detector a shield of preselected material for intercepting and capturing thermal neutrons and characterized by emission of neutron capture gamma radiation substantially within a fist energy range while deriving a first logging signal from said detector corresponding to gamma radiation in said first range and which results from gamma radiation impinging upon said detector in said bore hole, and deriving a second logging signal from said detector corresponding to gamma radiation in said second range, said first energy range including at least a substantial part of the lower energy portion of the neutron capture gamma spectrum of chlorine and having a lower limit of about 1 MeV or above and having an upper limit below said second range, said second energy range including at least a substantial part of the higher energy portion of the neutron capture gamma spectrum of chlorine and having a lower limit above said first range, whereby said first signal comprises a formation reference signal largely indicative of hydrogen, and whereby said second signal comprises a formation reference and chlorine signal largely indicative of both hydrogen and chlorine, and plotting said first and said logging signals in correlation whereby corresponding portions of said signals are indicative of hydrogen in said formations and differences in said two signals are indicative of chlorine in said formations.

23. The method of claim 11, wherein the neutron-gamma radiation component from said shield of preselected material is adjusted to neutralize the influence of boron in the formation on the detected signals.

24. The method of claim 22, wherein the neutron-gamma radiation component from said shield of preselected material is adjusted to neutralize the influence of boron in the formation on the detected signals.

25. In the method of conducting a radioactivity well log of earth formations traversed by a bore hole by passing a source of fast neutrons through the bore hole to irradiate said formations at successive locations along the bore hole and simultaneously passing a proportional gamma radiation detector through the bore hole for detecting gamma radiation in said bore hole resulting from said irradiation, the improvement involving maintaining around said detector a shield of preselected material having a relatively high neutron capture cross section for intercepting and capturing thermal neutrons and characterized by the emission of neutron-capture gamma radiation predominately within a first energy range and largely outside a second energy range, said detector being subjected to such radiation emitted by said shield, deriving a first logging signal from said detector corresponding to gamma radiation in said first range and deriving a second logging signal from said detector corresponding to gamma radiation in said second range, said first energy range including at least a substantial part of the dominant lower energy portion of the neutron-capture gamma spectrum characteristic of chlorine and having an upper limit below the dominant higher-energy neutron-capture gamma radiation spectrum characteristic of chlorine, said second energy range including at least a substantial part of the dominant higher energy portion of the neutron-capture gamma spectrum characteristic of chlorine and having a lower limit above the dominant lower energy portion of the neutron-capture gamma spectrum characteristic of chlorine, whereby said first signal comprises a formation reference signal largely indicative of hydrogen, and whereby said second signal comprises a formation reference and chlorine signal largely indicative of both hydrogen and chlorine.

26. The method of claim 25 further comprising the step of plotting said first and said second logging signals in correlation, whereby corresponding portions of said signals are indicative of hydrogen in said formations and differences in said two signals are indicative of chlorine in said formations.

27. The method of claim 25, wherein the neutron-capture gamma spectrum of the material of said shield corresponds to that of samarium.

28. The method of claim 25, wherein the neutron-gamma radiation component emitted from said shield of preselected material is adjusted to neutralize the influence of boron in the formation on the detected signals.

29. The method of claim 25, wherein said first range includes gamma radiation from about 1 MeV to about 3 MeV 30. The method of claim 29, wherein said second range includes gamma radiation from about 4 MeV to at least about 8 MeV.

31. Apparatus for conducting a radioactivity well log comprising an instrument adapted to be passed through a bore hole traversing a plurality of earth formations, said instrument including means comprising a source of fast neutrons for irradiating the earth formations along the bore hole and a radiation detector for detecting radiation resulting in the bore hole due to said irradiation of the formations by neutrons from said source, said radiation detector comprising a proportional gamma radiation detector having a multichannel pulse height analyzer associated therewith, including first and second channels for providing output signals in at least first and second energy ranges, said first energy range including at least a substantial part of the lower energy portion of the neutron-capture gamma spectrum characteristic of chlorine and having an upper limit below the dominant higher energy neutron-capture gamma radiation spectrum characteristic of chlorine, said second energy range including at least a substantial part of the dominant higher energy portion of the neutron-capture gamma spectrum characteristic of chlorine, a shield of preselected material substantially surrounding the active volume of said detector of said logging instrument, said preselected material having a relatively high capture cross section for thermal neutrons and having a characteristic neutron-capture gamma radiation emission predominantly within the energy range of said first channel and substantially outside the range of said second channel, said detector being exposed to such gamma radiation emitted by said shield, whereby the signal derived from said first channel comprises a formation reference signal largely indicative of hydrogen, and whereby the signal derived from said second channel comprises a formation reference and chlorine signal largely indicative of both hydrogen and chlorine.

32. Apparatus as defined in claim 31, wherein the preselected material of said shield is samarium.

33. Apparatus as defined in claim 31, wherein the preselected material of said shield is gadolinium.

34. Apparatus as defined in claim 31, wherein the preselected material of said shield is europium.

35. Apparatus as defined in claim 31, wherein said logging instrument includes a casing containing at least the radiation-sensitive portion of said gamma radition detector and wherein said shield of preselected material substantially surrounds at least that portion of said casing containing the radiation-sensitive portion of said detector.

36. Apparatus as defined in claim 35, wherein the preselected material of said shield comprises samarium oxide contained in a binder.

37. Apparatus as defined in claim 36, wherein said samarium oxide is contained in an epoxy-resin. binder.

38. Apparatus as defined in claim 31, wherein the first of said energy ranges corresponds to gamma radiation of 1.3 to 2.92 MeV and wherein the second of said energy ranges corresponds to gamma radiation of from about 3.43 MeV upward to at least about 8 MeV.

39. Apparatus as defined in claim 38, wherein the radiation-sensitive portion of said detector is a thallium-activated sodium iodide luminophor.

* * * * *